Dec. 31, 1963   O. E. EBERLE ETAL   3,115,758
FINGER RING WITH SPRING LOADED MOUNT FOR REMOVABLE GEMS
Filed Feb. 7, 1961   2 Sheets-Sheet 1

Inventors
OTTO EBERLE
WILLIAM J. HOARE
by: *Cavanagh & Norman*

Inventors
OTTO EBERLE
WILLIAM J. HOARE
by: Cavanagh & Norman.

ated Dec. 31, 1963

3,115,758
FINGER RING WITH SPRING LOADED MOUNT FOR REMOVABLE GEMS

Otto Eugen Eberle, West Hill, Ontario, and John Joseph Hoare, Scarborough, Ontario, Canada, assignors to Pre-Met Manufacturers Limited, Toronto, Ontario, Canada
Filed Feb. 7, 1961, Ser. No. 87,584
1 Claim. (Cl. 63—15)

This invention relates to a jewel mount for a finger ring or the like.

Conventional jewel mounts used on finger rings, brooches, pendants, necklaces and like articles of jewelry usually provide for permanent retention of the jewel or stone therein which must, as a rule, be "set" by a craftsman and thereafter removed by him only for cleaning and like purposes.

It is therefore an object of the invention to provide a jewel mount which will permit the wearer to remove the jewel at will and interchange it for another jewel if desired.

More specifically it is an object of the invention to provide a jewel mount having the foregoing advantages which will support and retain the jewel effectively without applying excessive force thereto.

More specifically it is an object of the invention to provide a jewel mount having the foregoing advantages which is of attractive neat appearance and of relatively simple economical construction.

A further and related objective of the invention is the provision of a finger ring embodying the aforesaid jewel mount.

The invention seeks to provide the foregoing and other objectives which will become apparent from the following description of a preferred embodiment by the provision of a jewel mount for a finger ring or the like wherein the jewel embodies mounting surfaces of predetermined related spacing, and comprising in combination: at least two opposed jaw members embodying gripping surfaces adapted to engage corresponding opposed mounting surfaces of said jewel; support means for locating said jaw members for relative motion of their gripping surfaces; spring means biasing the motion of at least one of said jaw members for gripping engagement of said jewel between said jaw members; and means forming part of said one of said jaw members and engageable by an operator for relatively opening said jaw members to release the said jewel therefrom.

Figure 2:
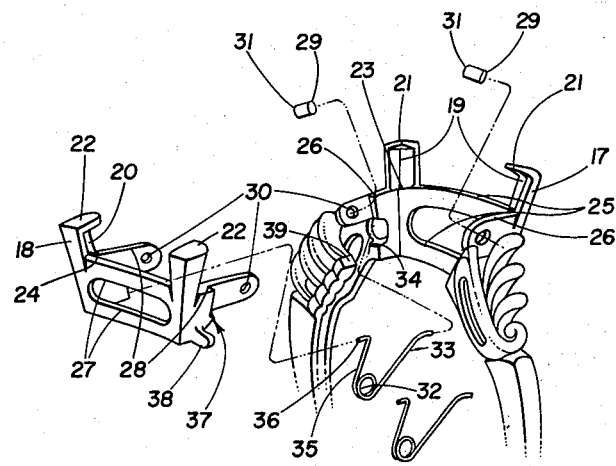
Figure 1:
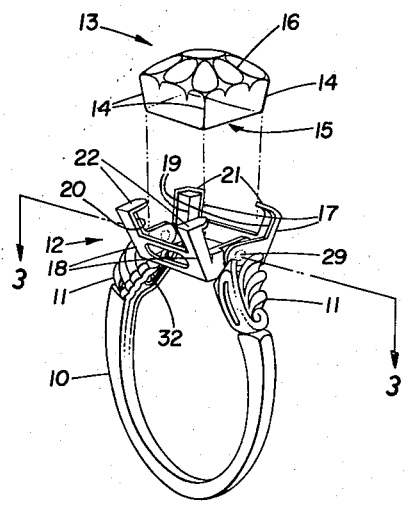
Figure 3:
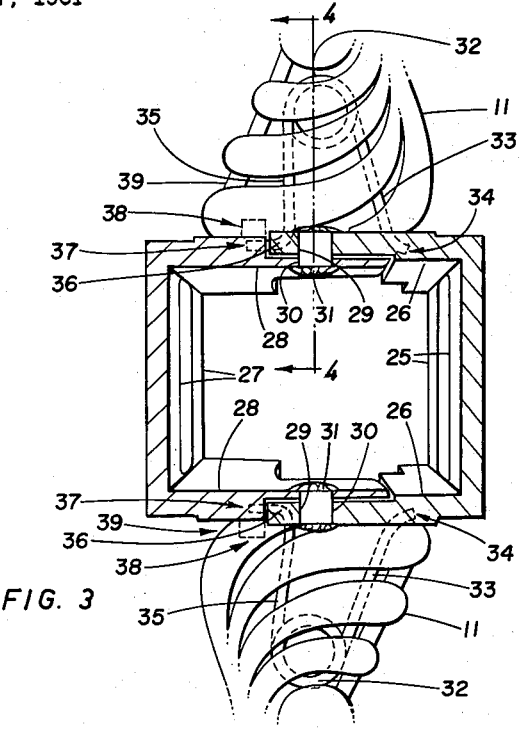
Figure 4:
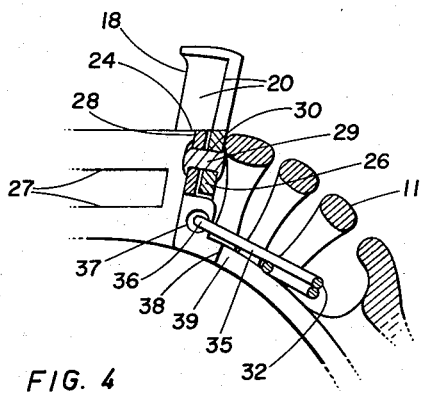

A preferred embodiment of the invention will now be described by way of example only with reference to the following drawings in which like reference devices refer to like parts thereof throughout the various views and diagrams and in which FIG. 1 is an isometric view of a finger ring embodying the instant jewel mount, showing the jewel removed therefrom, FIG. 2 is an exploded view of the jewel mount shown in FIG. 1, FIG. 3 is a sectional view of the jewel mount of FIG. 1 along the line 3—3, and FIG. 4 is a sectional view of the jewel mount of FIG. 1 along the line 4—4.

From FIG. 1 it will be seen that this preferred embodiment of the invention is a finger ring of conventional exterior appearance which is both attractive and appealing to the eye, and which generally comprises the band portion 10 extending around the finger of a wearer, relatively wide, ornate haunches 11 at either end thereof supporting the jewel mount 12 therebetween which in turn contains jewel 13 therewithin.

Before dealing with the details of jewel mount 12 it will be noted that jewel 13 is formed with mounting surfaces 14 of predetermined related spacing at each corner thereof, and has a base portion 15 concealed by mount 12, and a display surface 16 which may be cut in any suitable manner. Clearly the precise shape of jewel 13 will be dependent upon a number of features including its size and its physical nature, for example, the location of mounting surfaces 14 being variable in any particular situation.

From FIGS. 2, 3 and 4 it will be seen that jewel mount 12 comprises four opposed jaw members 17—17 and 18—18 located at the four corners of jewel 13 in this particular embodiment. Gripping surfaces 19 and 20 are provided on respective jaw members 17 and 18 for contacting and frictionally engaging mounting surfaces 14 of jewel 13 and extending over a relatively substantial area thereof for maximum safety. Claws 21 and 22 are provided at the free ends of jaw members 17 and 18 for overlying display surface 16 of jewel 13 and positively prevent escape thereof from the grip of jaw members 17 and 18. Base 15 of jewel 13 abuts against shoulders 23 and 24 at the lower ends of jaw members 17 and 18 thus completing the engagement of jewel 13 on all sides thereof. It will of course be appreciated that the specific design of jaw members 17 and 18 and associated gripping surfaces are more or less dependent upon the shape of jewel 13 and are intended to provide for maximum retention of jewel 13 within jewel mount 12 as a whole while yet producing an attractive and neat appearance.

Jaw members 17—17 are united together by the integral frame portions 25 extending therebetween and are provided with integral brackets 26 extending therefrom towards jaw members 18, for purposes to be described thereinafter. Brackets 26 are preferably formed integrally with haunches 11, fastening the same, and frame portions 25 and jaw members 17—17 in fixed relation thereto, the said elements being advantageously cast as a single unit, or alternatively in separate parts.

Similarly, jaw members 18—18 are united together by integral frame members 27 extending therebetween, and are provided with integral brackets 28 extending therefrom towards jaw members 17 and overlapping brackets 26 thereof. Hinge pins 29 pass through apertures 30 provided in overlapping portions of brackets 26 and 28 and permit swinging movement of jaw members 18—18 relative to jaw members 17—17 to a limited extent sufficient to alternately grasp and release jewel 13 therebetween.

Hinge pins 29 are provided with relatively narrow heads 31 soldered to brackets 28 thus fastening them permanently within apertures 30 aforesaid.

Springs 32 are located within haunches 11 and are provided with arms 33 biased to lodge firmly within recesses 34 formed in brackets 26 and also with arms 35, terminating in hooks 36 biased to lodge firmly within recesses 37 formed in brackets 28, springs 32 being inherently biased to force arms 33 and 35 apart and thus in turn to bias jaw members 18—18 to swing about hinge pins 29 towards jaw members 17—17.

In order to limit clamping engagement of jaw members 18—18 and 17—17 about jewel 13 stop members 38 extend outwardly from brackets 28 to interlock with abutments 39 formed on haunches 11 for the purpose, thus restricting swinging movement of jaw members 18—18 towards jaw members 17—17 beyond the point at which stop members 38 contact abutments 39.

It will be observed that brackets 26 and 28 are of reduced thickness for that part of their respective lengths which overlap one another, thus permitting the production of an effective hinge action of neat appearance characterized by an absence of unsightly protrusions. Also of note is the method of attachment of hinge pins 29, being by soldering, as stated above, which permits heads 31 to be ground down or otherwise shaped to conceal the locations thereof.

In operation the wearer of the ring may simply grasp jewel mount 12 between finger and thumb and apply pressure to the exterior of frame portions 25 and 27. Frame portions 27 and jaw members 18 associated therewith will then swing about hinge pins 29 passing through apertures 30 and compress arms 33 and 35 of springs 32 together, jaw members 18 swinging away from jaw members 17 at this point. Jewel 13 may then be inserted within jaw members 17 and 18 after which pressure may be relaxed permitting springs 32 to force arms 33 and 35 apart once more and thus in turn cause swinging movement of brackets 28, frame portions 27 and jaw members 18 back into their jewel-clamping position once more, stop members 38 contacting abutments 39 and limiting the scope of such movement to prevent injury to jewel 13.

When in the aforesaid jewel clamping position gripping surfaces 19 and 20 of jaw members 17 and 18 will be seen to frictionally engage mounting surfaces 14 of jewel 13, with claws 21 and 22 overlying and contacting display surface 16 of jewel 13 to provide for positive retention thereof.

It will thus be seen that this preferred embodiment of the invention provides a jewel mount of neat, attractive appearance, while providing for easy removal of the jewel therefrom for cleaning or otherwise, and being inherently suitable for marketing in association with a group or set of jewels of different colours, permitting the wearer to select the most suitable jewel for any particular occasion.

The foregoing is a description of a prefered embodiment of the invention by way of example only and it should be understood that the invention comprehends all such variations thereof as come within the scope of the appended claim.

What we claim is:

A finger ring of the type incorporating a jewel having mounting surfaces of predetermined related spacing and comprising:

a band portion lying in a plane for extending around the finger of a wearer;

haunches located spaced apart from one another connected at both ends of said band portion, said haunches being of hollow construction defining recesses therein having openings facing one another in spaced opposition;

fixed bracket portions rigidly attached to respective haunches by respective ends of said fixed bracket portions, the other ends thereof extending from said haunches in planes substantially normal to the plane of said band portion;

fixed frame members extending between and rigidly fastened to said other ends of said fixed bracket portions;

movable bracket portions hingedly attached to said fixed bracket portions by respective ends for swinging substantially in the said planes thereof about a pivoting axis located in the plane of said band portion;

movable frame members extending between and rigidly fastened to the other ends of said movable bracket portions for swinging together therewith as aforesaid;

jaw members rooted on and extending upwardly from the junctions between adjoining ones of said bracket portions and frame members, said jaw members attached to said movable bracket portions and frame members being swingable together therewith as aforesaid relative to the other said jaw members;

spring means located within and concealed by said recesses defined by said haunches;

at least one spring arm extending from respective said spring means through said openings and interengaged by and with said movable bracket portions radially inwardly of said axis biasing said jaw members attached thereto to swing towards said other jaw members, and, stop means integral with said movable bracket portions interlocking with said haunches and limiting said swinging movement of said jaw members in response to said spring means, said jaw members being manually movable in the reverse direction against the said biasing of said spring means.

References Cited in the file of this patent

UNITED STATES PATENTS

| 207,666 | Loebenstein | Sept. 3, 1878 |
| 1,121,296 | Schmidt | Dec. 5, 1914 |
| 1,152,340 | Obsboum | Aug. 31, 1915 |
| 1,971,265 | King | Aug. 21, 1934 |
| 2,028,284 | Jackson | Jan. 21, 1936 |
| 2,147,740 | Gruber | Feb. 21, 1939 |
| 2,583,961 | Nash et al. | Jan. 29, 1952 |

FOREIGN PATENTS

| 54,991 | Switzerland | May 5, 1911 |
| 341,345 | Switzerland | Nov. 14, 1959 |